US012336076B2

(12) United States Patent
Van Den Broek

(10) Patent No.: US 12,336,076 B2
(45) Date of Patent: Jun. 17, 2025

(54) CONTROLLING A LIGHTING DEVICE ASSOCIATED WITH A LIGHT SEGMENT OF AN ARRAY

(71) Applicant: SIGNIFY HOLDING B.V., Eindhoven (NL)

(72) Inventor: Paul Marijn Van Den Broek, Heythuysen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 119 days.

(21) Appl. No.: 17/918,308

(22) PCT Filed: Apr. 8, 2021

(86) PCT No.: PCT/EP2021/059164
§ 371 (c)(1),
(2) Date: Oct. 11, 2022

(87) PCT Pub. No.: WO2021/209306
PCT Pub. Date: Oct. 21, 2021

(65) Prior Publication Data

US 2023/0146188 A1 May 11, 2023

(30) Foreign Application Priority Data

Apr. 14, 2020 (EP) .................................... 20169322

(51) Int. Cl.
*H05B 47/155* (2020.01)

(52) U.S. Cl.
CPC .................................. *H05B 47/155* (2020.01)

(58) Field of Classification Search
CPC ..... G06F 3/04144; G06F 3/041; H05B 45/20; H05B 45/10; H05B 45/40; H05B 45/305; H05B 47/155
See application file for complete search history.

(56) References Cited

U.S. PATENT DOCUMENTS

2019/0335560 A1 10/2019 Kurvers et al.
2020/0374998 A1* 11/2020 Engelen ............... H05B 47/105
2021/0033247 A1* 2/2021 Van Bommel ..... H05B 45/3577
(Continued)

FOREIGN PATENT DOCUMENTS

WO 2005052751 A2 6/2005
WO 2017186532 A1 11/2017
(Continued)

*Primary Examiner* — Monica C King

(57) ABSTRACT

A system is configured to display a representation (90) of an array of individually addressable light segments (11-13) on a display and receive user input indicative of an association between a further lighting device (35-37) and at least one of the segments of the array. The system is further configured to associate, based on the user input, the further lighting device with the at least one segment, store the association in a memory, and receive a command for controlling the array. The command comprises at least one light setting for the at least one segment. The system is further configured to determine a further light setting for the further lighting device based on the association and the at least one light setting, control the array based on the command, and control the further lighting device based on the further light setting.

18 Claims, 6 Drawing Sheets

(56) References Cited

U.S. PATENT DOCUMENTS

| | | | | |
|---|---|---|---|---|
| 2021/0144836 | A1* | 5/2021 | Krajnc | H05B 47/175 |
| 2021/0153310 | A1* | 5/2021 | Van Neer | H05B 45/305 |

FOREIGN PATENT DOCUMENTS

| | | | |
|---|---|---|---|
| WO | 2018224390 | A1 | 12/2018 |
| WO | 2019002012 | A1 | 1/2019 |
| WO | 2019020482 | A1 | 1/2019 |
| WO | 2019087165 | A1 | 5/2019 |
| WO | 2019214941 | A1 | 11/2019 |
| WO | 2020035310 | A1 | 2/2020 |

* cited by examiner

CONTROLLING A LIGHTING DEVICE ASSOCIATED WITH A LIGHT SEGMENT OF AN ARRAY

CROSS-REFERENCE TO PRIOR APPLICATIONS

This application is the U.S. National Phase application under 35 U.S.C. § 371 of International Application No. PCT/EP2021/059164, filed on Apr. 8, 2021, which claims the benefit of European Patent Application No. 20169322.3, filed on Apr. 14, 2020. These applications are hereby incorporated by reference herein.

FIELD OF THE INVENTION

The invention relates to a system for controlling a lighting system, said lighting system comprising an array of individually addressable light segments and a further lighting device.

The invention further relates to a method of controlling a lighting system, said lighting system comprising an array of individually addressable light segments and a further lighting device.

The invention also relates to a computer program product enabling a computer system to perform such a method.

BACKGROUND OF THE INVENTION

With the introduction of LED technology, it has become possible to produce light strips to illuminate houses and offices. An advantage of light strips is that they can illuminate a large width space relatively uniformly. Initially, all LEDs of a light strip were only able to emit one color, e.g. white. Later, certain light strips allowed a user to change the color emitted by the LEDs, but all LEDs still emitted the same color. The next advance in light strips was the pixelated light strip. Pixelated light strips comprise multiple individually controllable segments, each such segment generally referred to as a 'pixel' of which e.g. the color and/or intensity of light emitted may be controlled. Each segment comprises one LED or multiple LEDs of the same or different colors.

A pixelated light strip enables new use cases for lighting and entertainment e.g. gradients, dynamic scenes and/or animations. Typically, multiple devices of a lighting system are used to render immersive light effects. If these multiple devices include one or more pixeled lighting devices, the quantity of individually addressable light sources in the lighting system is relatively large and therefore, the quantity of light settings that needs to be determined is relatively large. It is sometimes possible to provide a higher-level light effect description without specifying the individual light settings of light segments or of other light sources. An example of this is disclosed in WO 2018/224390 A1. However, it is not always possible or desirable to provide such a higher-level light effect description.

WO 2019/002012 A1 discloses a device comprising: an array of individually controllable LED light sources; data lines for interconnecting successive LED light sources to obtain a daisy-chain of successive LED light sources in said array and for rippling control data through the daisy-chain to a particular LED light source in said array, wherein the particular LED light source in said array is arranged for removing one or more bits from the control data and for providing resulting control data downstream in the daisy-chain; a feedback line for feeding back the resulting control data; a touchpad for connecting, when in use touched, one of the data lines and the feedback line; a controller comprising (i) an output for sending the control data over said data lines to the particular LED light source, and (ii) an input for receiving the resulting control data over the feedback line when the touchpad is touched; and the controller being arranged for (i) comparing said sent control data with said received resulting control da-ta for associating the touchpad, when in use touched, with a position in the array of individually controllable LED light sources of the particular LED light source, and (ii) providing a control signal for controlling the load based on said position.

SUMMARY OF THE INVENTION

It is a first object of the invention to provide a system, which makes it easier to create immersive light effects without requiring a higher-level light description.

It is a second object of the invention to provide a method, which makes it easier to create immersive light effects without requiring a higher-level light description.

In a first aspect of the invention, a system for controlling a lighting system, said lighting system comprising an array of individually addressable light segments and a further lighting device. The system comprises at least one input interface, at least one output interface, and at least one processor configured to display, via said at least one output interface, a first representation of said array of individually addressable light segments and a second representation of said further lighting device on a display, receive user input via said at least one input interface, wherein said user input is indicative of an association between said second representation of said further lighting device and at least one of said individually addressable light segments of said first representation of said array, associate, based on said user input, said further lighting device with said at least one individually addressable light segment of said array, and store said association in a memory.

Said at least one processor is further configured to receive, via said at least one input interface, a command for controlling said array of individually addressable light segments, said command comprising at least one light setting for said at least one individually addressable light segment, determine a further light setting for said further lighting device based on said association and said at least one light setting, control, via said at least one output interface, said array of individually addressable light segments based on said command, and control, via said at least one output interface, said further lighting device based on said further light setting.

In other words, the user is able to (virtually) link/associate (the representation of) the further lighting device to at least one segment of an array of individually addressable light segments (also referred to as pixels), e.g. a pixelated light strip, using a displayed representation of the array. This makes it easier for the user to create immersive effects without requiring a higher-level light description. The further lighting device may the copy the effect of the pixel(s) it is linked to (i.e. render the same color and (relative) intensity) or provide a related effect, e.g. dim the effect it is currently rendering and adapt it to the effect which is 'passing by' on the array.

This makes it possible to strengthen the effects rendered by the array with, or extend them to, further lighting devices near the array. For example, an effect rendered on a pixelated light strip can be extended at the outer ends of the light-strip by (virtually) linking regular connected lights (e.g. a Philips Hue bulb) to the pixels at the edges of the light strip. The array may be a pixelated light strip or a pixelated floor lamp, for example.

Said at least one individually addressable light segment may comprise one individually addressable light segment and said at least one light setting may comprise a light setting for said one individually addressable light segment. In this case, for example, said further light setting may be identical to said light setting, e.g. to strengthen a light effect, or said at least one processor may be configured to determine said further light setting based on an extrapolation of said light setting, e.g. to extend a light effect.

Said at least one individually addressable light segment may comprise a plurality of individually addressable light segments and said at least one light setting may comprise a plurality of light settings for said plurality of individually addressable light segments. In this case, for example, said at least one processor may be configured to determine said further light setting based on an interpolation of said plurality of light settings, e.g. to strengthen a light effect in an enhanced manner.

Said at least one processor may be configured to allow a user to link said further lighting device with said at least one individually addressable light segment in said representation of said array, and wherein said association is based on said linking. By letting the user change the displayed representation, the user may be able to link the further lighting device with light segment(s) in an intuitive manner.

Said at least one processor may be configured to allow said user to link said further lighting device with one or more light elements of said at least one individually addressable light segment in said representation of said array. If the user is not able to distinguish different segments from each other, but only different light elements, e.g. when the array is turned off, it may be more intuitive to allow the user to link the further lighting device with at least one light element instead of directly with at least one segment. The light segment(s) corresponding to the linked light element(s) can then be automatically associated with the further lighting device, as each light segment belongs to only one light segment.

Said at least one processor may be configured to allow said user to link said further lighting device with said at least one individually addressable light segment in said representation of said array by allowing said user to position a virtual light segment on said representation of said array. For example, a pixelated light strip may be extended with additional (virtual) pixels and these virtual pixels may be used, for example, to strengthen the light effects for this array.

Said at least one processor may be configured to receive, via said at least one input interface, an current command for controlling said further lighting device, said current command comprising an current light setting, and determine said further light setting for said further lighting device based on said association, said at least one light setting, and said current light setting. For example, the further lighting device may dim the effect it is currently rendering and adapt it to the effect which is 'passing by' on the pixelated light strip In a second aspect of the invention, a method of controlling a lighting system, said lighting system comprising an array of individually addressable light segments and a further lighting device, comprises displaying a first representation of said array of individually addressable light segments and a second representation of said further lighting device on a display, receiving user input, wherein said user input is indicative of an association between said and a second representation of said further lighting device and at least one of said individually addressable light segments of said first representation of said array, associating, based on said user input, said further lighting device with said at least one individually addressable light segment of said array, and storing said association in a memory.

Said method further comprises receiving a command for controlling said array of individually addressable light segments, said command comprising at least one light setting for said at least one individually addressable light segment, determining a further light setting for said further lighting device based on said association and said at least one light setting, controlling said array of individually addressable light segments based on said command, and controlling said further lighting device based on said further light setting. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a lighting system, said lighting system comprising an array of individually addressable light segments and a further lighting device.

The executable operations comprise displaying a representation of said array of individually addressable light segments on a display, receiving user input, wherein said user input is indicative of an association between said further lighting device and at least one of said individually addressable light segments of said array, associating, based on said user input, said further lighting device with said at least one individually addressable light segment of said array, and storing said association in a memory.

The executable operations further comprise receiving a command for controlling said array of individually addressable light segments, said command comprising at least one light setting for said at least one individually addressable light segment, determining a further light setting for said further lighting device based on said association and said at least one light setting, controlling said array of individually addressable light segments based on said command, and controlling said further lighting device based on said further light setting.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
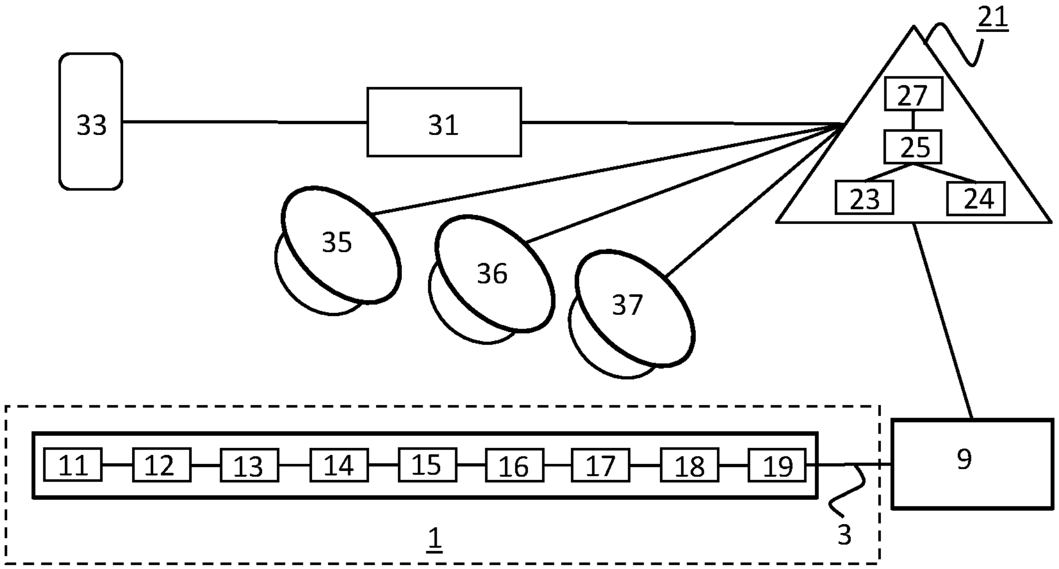
FIG. 1 is a block diagram of a first embodiment of the system.

FIG. 1 shows a first embodiment of the system for controlling a lighting system: a bridge 21. The lighting system comprises an array of individually addressable light segments 11-19 and further lighting devices 35-37. In the example of FIG. 1, this array is a light strip 1.

Each of the individually addressable segments 11-19 of the light strip 1 comprises one or more light elements. The light strip 1 is connected to a controller 9 via cable 3. The controller 9 comprises a receiver, e.g. a Zigbee receiver, and a power converter for converting power received from the power mains to a lower voltage and providing the converted power to the light strip 1.

In the example of FIG. 1, each of the segments 11-19 comprises a single light element, e.g. a direct emitting or phosphor converted LED. Alternatively, one or more of the segments may comprise multiple light elements. The light strip 1 comprises nine individually controllable segments. Nine light elements per light strip will in practice be a relatively low quantity of light elements per light strip, but this quantity has been chosen for the purpose of illustration.

The bridge 21 controls the light strip 1 via the light strip controller 9, e.g. using Zigbee technology. The bridge 21 also controls the further lighting devices 35-37. The bridge 21 may be a Philips Hue bridge, for example. The bridge 21 is connected to the wireless LAN access point 31, e.g. via Ethernet or Wi-Fi. A mobile device 33 is also connected to the wireless LAN access point 23, e.g. via Wi-Fi. Mobile device 33 may be a mobile phone, a tablet or a smart watch, for example. A user may be able to use an app running on mobile device 33 to control further lighting devices 35-37 via the wireless LAN access point 31 and the bridge 21 and control light strip 1 via the wireless LAN access point 31, the bridge 21 and the light strip controller 9.

The bridge 21 comprises a receiver 23, a transmitter 24, a processor 25, and memory 27. The processor 25 is configured to display, via the transmitter 24, a first representation of the array of individually addressable light segments, i.e. the light strip 1, and a second representation of the further lighting device on a display of the mobile device 33, and receive user input (from mobile device 33) via the receiver 23, wherein the user input is indicative of an association between one or more of the further lighting devices 35-37 and at least one of the individually addressable light segments 11-19 of the array. The user input may be indicative of one association or of multiple associations.

The processor 25 is further configured to associate, based on the user input, the representations of one or more further lighting devices with the at least one individually addressable light segment of the representation of the array and store the association in memory 27. If the user input was indicative of multiple associations, these multiple associations are stored in memory 27. The processor 25 is further configured to receive, via the receiver 23, a command for controlling the array of individually addressable light segments, i.e. the light strip 1, e.g. from mobile device 33. The command comprises at least one light setting for the at least one individually addressable light segment. Each light setting may comprise a color component and/or an intensity component, for example.

The processor 25 is further configured to determine a further light setting for the one or more further lighting devices based on the association and the at least one light setting, control, via the transmitter 24, the array of individually addressable light segments, i.e. light strip 1, based on the command, and control, via the transmitter 24, the one or more further lighting device, i.e. one or more of lighting devices 35-37, based on the further light setting. This processor 25 is configured to do this for other stored associations as well.

The further light setting may be the same as light setting of the light segment with which it is associated, for example. In this case, the further lighting device could copy the behavior of the associated light segment continuously or only if the intensity component of the light setting exceeds a certain threshold. The further light setting may also be based on light settings for multiple segments, e.g. an interpolation or an extrapolation of these multiple light settings. The further light setting may be based on an interpolation of the multiple light settings if the further lighting device has been associated with multiple segments.

In the embodiment of FIG. 1, the mobile device 33 creates a higher-level light command for the light strip 1, e.g. based on the selection of a scene by a user of the mobile device 33. The mobile device 33 has access to information, e.g. obtained when commissioning the light strip 1, that indicates that the light strip 1 has nine individually controllable segments and creates light settings for each of these nine segments or a subset thereof. When the bridge 21 receives the higher-level light command from the mobile device 33, it derives a lower-level light command for the light strip 1 from this higher-level light command and it derives one or more lower-level light commands for the one or more further lighting devices associated with one or more segments of the light strip 1 from this higher level-light command. The bridge 21 then transmits these lower-level light commands to their destination.

In the embodiment of the bridge 21 shown in FIG. 1, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example.

The receiver 23 and the transmitter 24 may use one or more wired or wireless communication technologies such as Zigbee to communicate with the light strip controller 9 and further lighting devices 35-37 and Ethernet to communicate with the wireless LAN access point 31, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 23 and the transmitter 24 are combined into a transceiver. The bridge 21 may comprise other components typical for a bridge such as a power connector. The invention may be implemented using a computer program running on one or more processors.

In the embodiment of FIG. 1, the system of the invention is a bridge. In an alternative embodiment, the system of the invention is a different device, e.g. an HDMI module or a mobile device. In the embodiment of FIG. 1, the system of the invention comprises a single device. In an alternative embodiment, the system of the invention comprises a plurality of devices.

Figure 2:
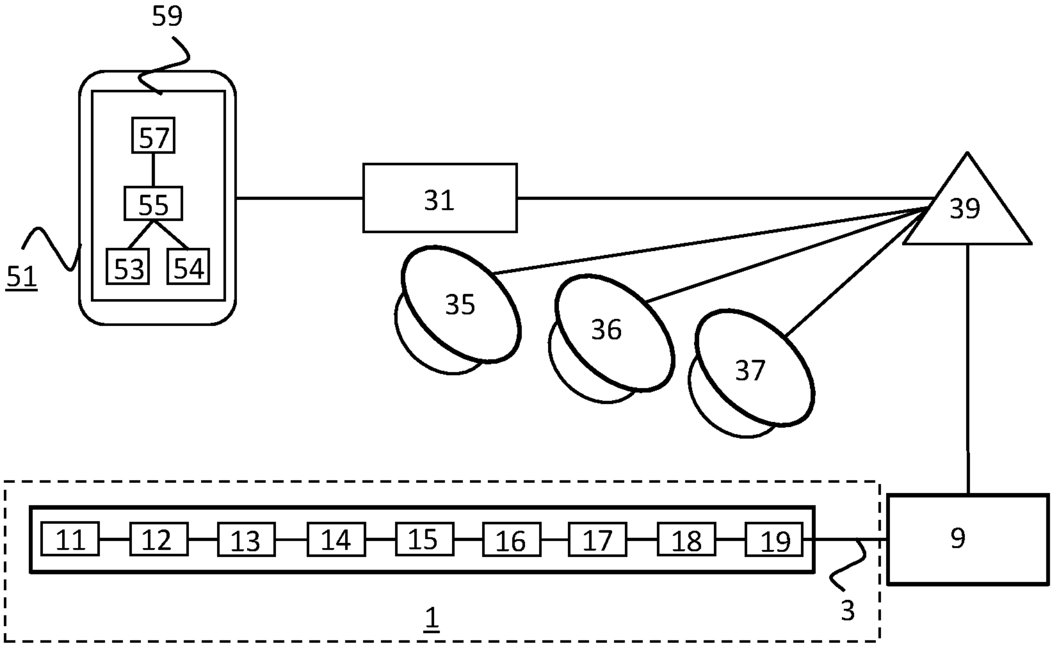
FIG. 2 is a block diagram of a second embodiment of the system

FIG. 2 shows a second embodiment of the of the system for controlling a lighting system: a mobile device 51. The lighting system comprises an array of individually addressable light segments 11-19 and further lighting devices 35-37. In the example of FIG. 2, this array is a light strip 1.

The mobile device 51 may be a mobile phone, a tablet or a smart watch, for example. A user may be able to use an app running on mobile device 51 to control further lighting devices 35-37 via the wireless LAN access point 31 and a bridge 39 and control light strip 1 via the wireless LAN access point 31, the bridge 39 and the light strip controller 9. In the embodiment of FIG. 2, the light strip 1 and the further lighting devices 35-37 are controlled via the bridge 39. In an alternative embodiment, the light strip 1 and/or one or more of the further lighting devices 35-37 are controlled without a bridge, e.g. a direct Bluetooth connection may be setup between the mobile device 51 and the light strip controller 9.

The mobile device 51 comprises a receiver 53, a transmitter 54, a processor 55, a memory 57, and a touchscreen display 59. The processor 55 is configured to display, via the display 59 and an interface to the display 59, a first representation of the array of individually addressable light segments, i.e. the light strip 1, and a second representation of the further lighting device on the display 59, and receive user input via the (touchscreen) display 59, wherein the user input is indicative of an association between one or more of the representations of the further lighting devices 35-37 and at least one of the individually addressable light segments 11-19 of the representation of the array. The user input may be indicative of one association or of multiple associations.

The processor 55 is further configured to associate, based on the user input, the one or more further lighting devices with the at least one individually addressable light segment of the array and store the association in memory 57. If the user input was indicative of multiple associations, these multiple associations are stored in the memory 57. The processor 55 is further configured to receive, via the (touchscreen) display 59, a command for controlling the array of individually addressable light segments, i.e. the light strip 1. The command comprises at least one light setting for the at least one individually addressable light segment. For example, the user of the mobile device 51 may use the (touchscreen) display 59 to select a light scene with which one or more light settings, including the at least one light setting, are associated.

The processor 55 is further configured to determine a further light setting for the one or more further lighting devices based on the association and the at least one light setting, control, via the transmitter 54, the array of individually addressable light segments, i.e. light strip 1, based on the command, and control, via the transmitter 54, the one or more further lighting devices, i.e. one or more of lighting devices 35-37, based on the further light setting. This processor 55 is configured to do this for other stored associations as well.

In the embodiment of FIG. 2, the mobile device 51 creates a higher-level light command for the light strip 1, e.g. based on the selection of a scene by a user of the mobile device 51. The mobile device 51 has access to information, e.g. obtained when commissioning the light strip 1, that indicates that the light strip 1 has nine individually controllable segments and determined light settings for each of these nine segments or a subset thereof. The mobile device 51 has also stored associations between one or more of the further lighting devices 35-37 and one or more of the segments 11-19 of the light strip 1. The mobile device 51 therefore also creates one or more higher-level light commands for the further lighting device(s) associated with one or more segments of the light strip 1 based on the light setting(s) determined for the associated one or more segments.

In the embodiment of FIG. 2, the mobile device 51 then transmits the higher-level light commands to the bridge 39. The bridge 39 then derives lower-light light command for the light strip 1 and the further lighting device(s) from the higher-level light commands and transmits them to their destination. In an alternative embodiment, the mobile device 51 transmits the higher-level light commands directly to their destination.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g. from ARM or Qualcomm or an application-specific processor. The processor 55 of the mobile device 51 may run an Android or iOS operating system for example. The display 59 may comprise an LCD or OLED display panel, for example. In the embodiment of FIG. 2, the display 59 is a touch screen display. In an alternative embodiment, user input may be provided with physical keys, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 31, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

Figure 3:
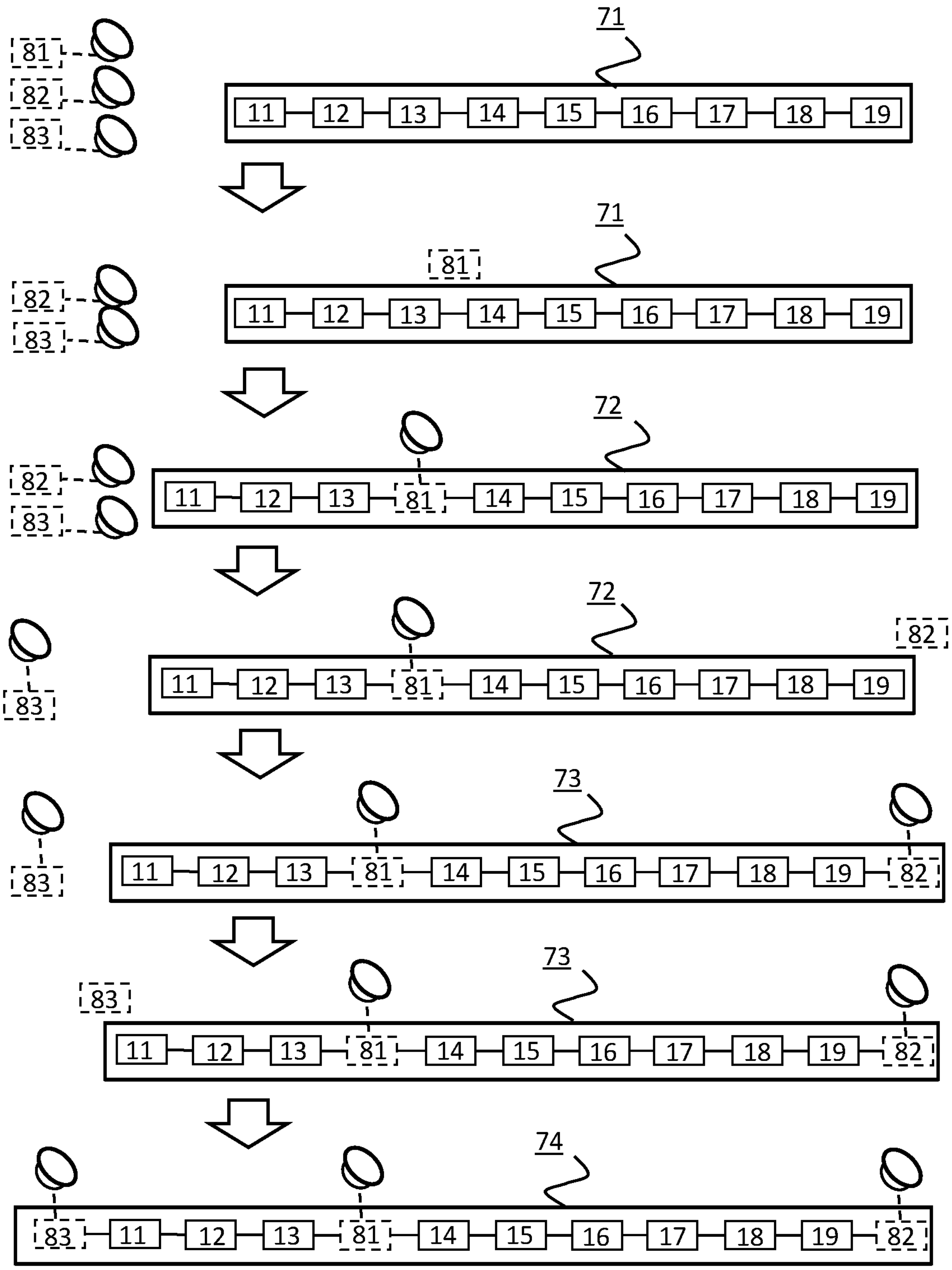
FIG. 3 shows an example of lighting devices being linked to light segments of an array.
Figure 4:
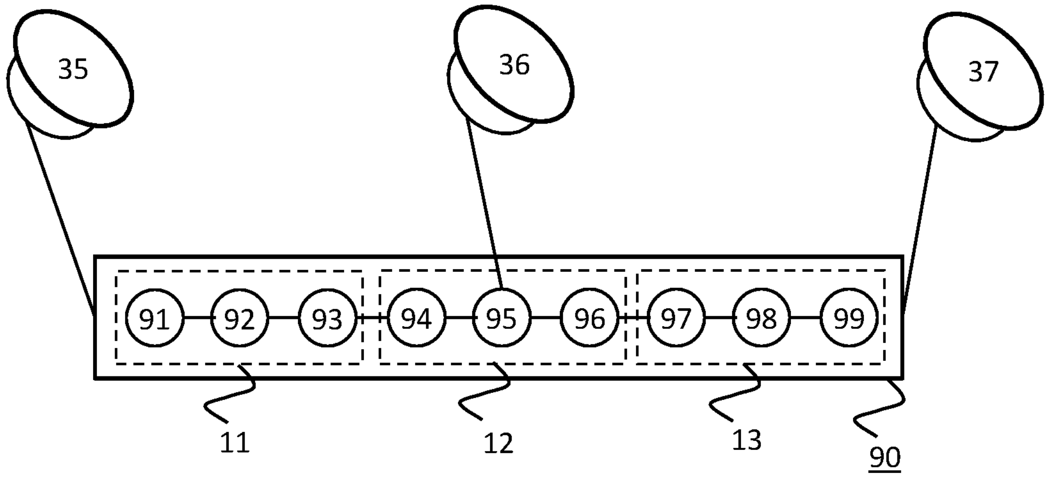
FIG. 4 shows an example of lighting devices being linked to light elements of an array.

FIGS. 3 and 4 provide examples of a how a user might be allowed to link/associate a representation of a further lighting device with at least one individually addressable light segment or at least one light element in a representation of an array of individually addressable light segments (also referred to as pixels). FIG. 3 shows an example of lighting devices being linked to light segments of an array. In the example of FIG. 3, a user can position a virtual light segment on a representation of a pixelated light strip.

The pixelated light strip is visually presented as a sequence of controllable pixels, e.g. in a smartphone app. Three further lighting devices, e.g. of the type Hue Go, are represented by virtual pixels 81-83. The user can move each virtual pixel in the sequence of controllable pixels to the location where he/she wants to strengthen or extend the light strip.

In representation 71, the light strip has nine real pixels 11-19 which each correspond to a real segment of the light strip. A user then drags virtual pixel 81 between real pixels 13 and 14 of the light strip. As a result, the further lighting device corresponding to the virtual pixel 81 becomes the fourth pixel of the new representation 72 of the light strip. This new representation 72 has nine real pixels 11-19 and one virtual pixel 81.

Next, a user drags virtual pixel 82 to one end of the light strip. As a result, the further lighting device corresponding to the virtual pixel 82 becomes the eleventh pixel of the new representation 73 of the light strip. This new representation 73 has nine real pixels 11-19 and two virtual pixels 81 and 82.

Next, a user drags virtual pixel 83 to the other end of the light strip. As a result, the further lighting device corresponding to the virtual pixel 83 becomes the first pixel of the new representation 74 of the light strip. This new representation 74 has nine real pixels 11-19 and three virtual pixels 81 and 82. In the new representation 74, the virtual pixel 82 is the twelfth pixel.

When a command is transmitted with a light effect for the light strip, virtual pixels 82 and 83 extend the light effect beyond the light strip using the further lighting devices corresponding to the virtual pixels 82 and 83. This extension may be linear, for example. For instance, during an explosion, a linearly extended strip would extend the light effect from inward to outward and continue to the sides. Depending on the effect required, the intensity of the pixels may be regulated for brightness. For example, if the further lighting devices corresponding to virtual pixels 82 and 83 have a large lumen output, their brightness will normally need to be dimmed.

If a virtual pixel is positioned in the middle of the light strip and a command to render a sunrise effect is transmitted to the light strip, the intensity of the further lighting device corresponding to this virtual pixel may be larger than the intensity of the real pixels/segments and may not need to be dimmed or not need to be dimmed as much, thereby simulating the effect a real sunrise has.

In the example of FIG. 4, a user can link a further lighting device with one or more light elements of at least one individually addressable light segment in a representation of a pixelated light strip. In representation 90, the light strip has three segments 11-13 with three light elements per segment. The light strip has nine light elements 91-99 in total. Light elements 91-93 can only be controlled as a group. The same applies to light elements 94-96 and light elements 97-99, respectively.

In the example of FIG. 4, three further lighting devices 35-37 can be linked with the light elements 91-99 of the light strip. For example, further lighting devices 35-37 may stand on a desk and the light strip may be placed along the edge of the desk. Further lighting device 36 is on the desk close to the center of the pixelated light strip and the light element 95 is therefore linked by the user to the further lighting device 36 to strengthen the center light element. Alternatively, the light elements 94-96 or any (non-empty) subset of these three light elements could be linked to the further lighting device 36, as light elements 94-96 are part of the same segment 12 and therefore render the same light effect.

Further lighting devices 35 and 37 are standing at each end of the pixelate light strip. Further lighting device 35 is linked by the user to the left edge of the light strip and therefore to light element 91. Linking a further lighting device to an edge of the light strip automatically links the further lighting device to the corresponding edge light element. If the further lighting device 35 would only be linked to light element 91, the further lighting device 35 would render the same color as the light element 91. Since the further lighting device 35 has been linked to the left edge of the light strip, the color for the further lighting device 35 is extrapolated based on the color of the light elements 91 and 92.

Further lighting device 37 is linked by the user to the right edge of the light strip and therefore to light element 99. If the further lighting device 37 would only be linked to light element 99, the further lighting device 37 would render the same color as the light element 99. Since the further lighting device 37 has been linked to the right edge of the light strip, the color for the further lighting device 37 is extrapolated based on the color of the light elements 98 and 99.

Since further lighting device 35 has been linked to the light element 91, the further lighting device 35 is associated with light segment 11 to which light element 91 belongs. Since further lighting device 36 has been linked to the light element 95, the further lighting device 36 is associated with light segment 12 to which light element 95 belongs. Since further lighting device 37 has been linked to the light element 99, the further lighting device 37 is associated with light segment 13 to which light element 99 belongs.

Figure 5:
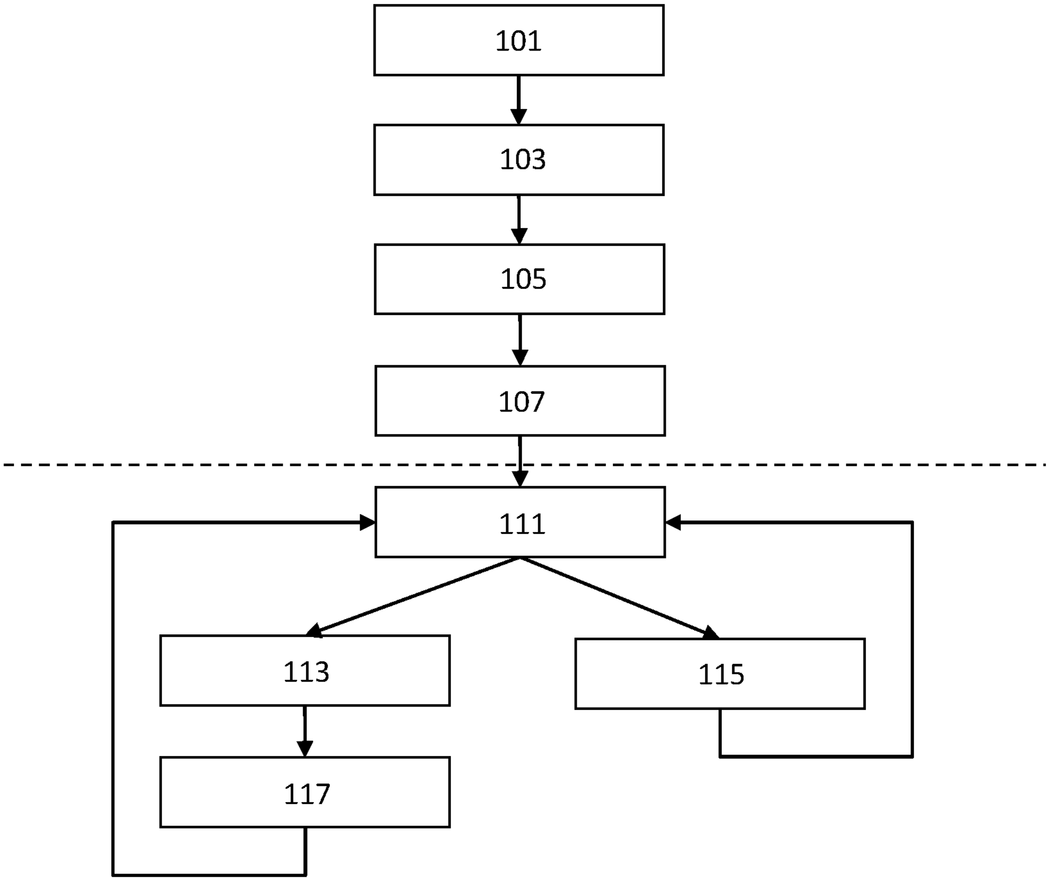
FIG. 5 is a flow diagram of a first embodiment of the method.

A first embodiment of the method of controlling a lighting system is shown in FIG. 5. The lighting system comprises an array of individually addressable light segments and a further lighting device. A step 101 comprises displaying a first representation of the array of individually addressable light segments and a second representation of the further lighting device on a display. A step 103 comprises receiving user input, wherein the user input is indicative of an association between the second representation of the further lighting device and at least one of the individually addressable light segments of the first representation of the array. A step 105 comprises associating, based on the user input, the further lighting device with the at least one individually addressable light segment of the array. A step 107 comprises storing the association in a memory.

Later, a step 111 is performed. Step 111 comprises receiving a command for controlling the array of individually addressable light segments. The command comprises at least one light setting for the at least one individually addressable light segment. A step 113 comprises determining a further light setting for the further lighting device based on the association and the at least one light setting. A step 115 comprises controlling the array of individually addressable light segments based on the command. A step 117 comprises controlling the further lighting device based on the further light setting. Step 111 is repeated after steps 115 and 117 have been performed, after which the method proceeds as shown in FIG. 5.

Figure 6:
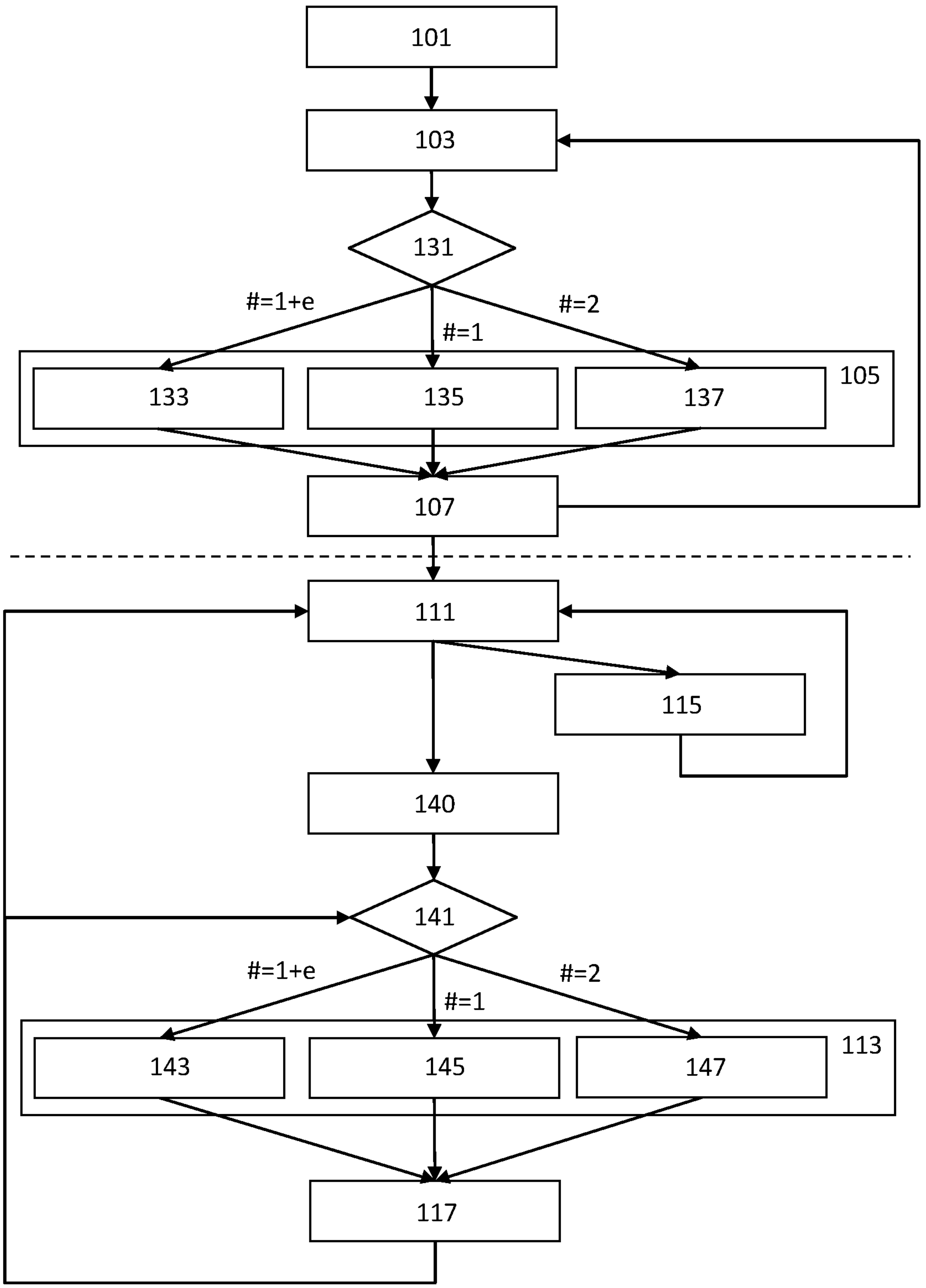
FIG. 6 is a flow diagram of a second embodiment of the method.

A second embodiment of the method of controlling a lighting system is shown in FIG. 6. Step 101 comprises displaying a first representation of the array of individually addressable light segments and a second representation of the further lighting device on a display. Step 103 comprises receiving user input, wherein the user input is indicative of an association between the second representation of the further lighting device and at least one of the individually addressable light segments of the first representation of the array.

Next, a step 131 comprises determining whether the user input is indicative of an association between the further lighting device and a single light segment or between the further lighting device and multiple light segments, and if the user input is indicative of an association with a single light segment, whether the user input is further indicative of an association between the further lighting device and an edge of the array. Step 105 is performed after step 131. Step 105 comprises associating, based on the user input received in step 103, the further lighting device with the at least one individually addressable light segment of the array. In the embodiment of FIG. 6, one of steps 133, 135 and 137 is performed in each iteration of step 105.

If it is determined in step 131 that the user input is indicative of an association between the further lighting device and both an edge of the array and a single light segment, i.e. an edge light segment, step 133 is performed. Step 133 comprises associating the further lighting device with this edge and this edge light segment. By associating the further lighting device with a single light segment, it can later be determined that no interpolation needs to be performed. This is not a requirement that only a light setting of the single light segment is later used.

If it is determined in step 131 that the user input is indicative of an association between the further lighting device and only a single light segment, step 135 is performed. Step 135 comprises associating the further lighting device with this single light segment. The single light segment may be an edge light segment, for example. In this case, the further lighting device has not been associated with an edge of the array.

If it is determined in step 131 that the user input is indicative of an association between the further lighting device and multiple light segments, step 137 is performed. Step 137 comprises associating the further lighting device with these multiple light segments. Step 107 comprises storing the association determined in step 105 in a memory. Steps 103, 131, 105 and 107 may be repeated for one or more additional further lighting devices after step 107 has been performed for the current further lighting device.

Later, step 111 is performed. Step 111 comprises receiving a command for controlling the array of individually addressable light segments. Steps 115 and 140 are performed after step 111. Step 115 comprises controlling the array of individually addressable light segments based on the command received in step 111.

Step 140 comprises determining, based on the associations stored in the memory, which one or more further lighting devices have been associated with at least one light segment of the array. Step 141 is performed for each further lighting device which has been associated with at least one light segment of the array. First, step 141 is performed for the first further lighting device. Step 141 comprises determining for a further lighting device with which light segment(s) of the array it has been associated and if the further lighting device has been associated with a single light segment, whether the further lighting device has also been associated with an edge of the array.

Step 113 is performed after step 141. Step 113 comprises determining a further light setting for the further lighting device based on the association and the at least one light setting. In the embodiment of FIG. 6, one of steps 143, 145 and 147 is performed in each iteration of step 113.

If it is determined in step 141 that the further lighting device has been associated with a single light segment and an edge of the array, step 143 is performed. In step 143, the light setting associated with this single light segment is obtained from the command received in step 111. If the further lighting device has been associated with the left edge of the array, then one or more light settings of one or more light segments to the right of the left-edge light segment are obtained.

If the further lighting device has been associated with the right edge of the array, then one or more light settings of one or more light segments to the left of the right-edge light segment are obtained. The further light setting for the further lighting device is determined based on an extrapolation of these obtained light settings, e.g. such that the difference between the further light setting and the light setting of the edge light segment is the same as or similar to the difference between the light setting of the edge light segment and the light setting of the light segment next to it.

If it is determined in step 141 that the further lighting device has been associated with only a single light segment, step 145 is performed. In step 145, the light setting associated with this single light segment is obtained from the command received in step 111 and this light setting is used as further light setting. Thus, the further light setting is identical to the obtained light setting.

If it is determined in step 141 that the further lighting device has been associated with two light segments, step 147 is performed. In step 147, the light settings associated with these two light segments are obtained from the command received in step 111. The further light setting is determined based on an interpolation of these light settings. For example, the average of these light settings may be used as further light setting.

Step 117 comprises controlling the further lighting device based on the further light setting determined in step 143, step 145 or step 147. If step 141 has not been performed for all further lighting devices identified in step 140 yet, steps 141, 113 and 117 are repeated for the next further lighting device after step 117 has been performed for the current further lighting device. Step 111 is repeated after step 115 has been performed and step 117 has been performed for all further lighting devices identified in step 140, after which the method proceeds as shown in FIG. 6.

Figure 7:
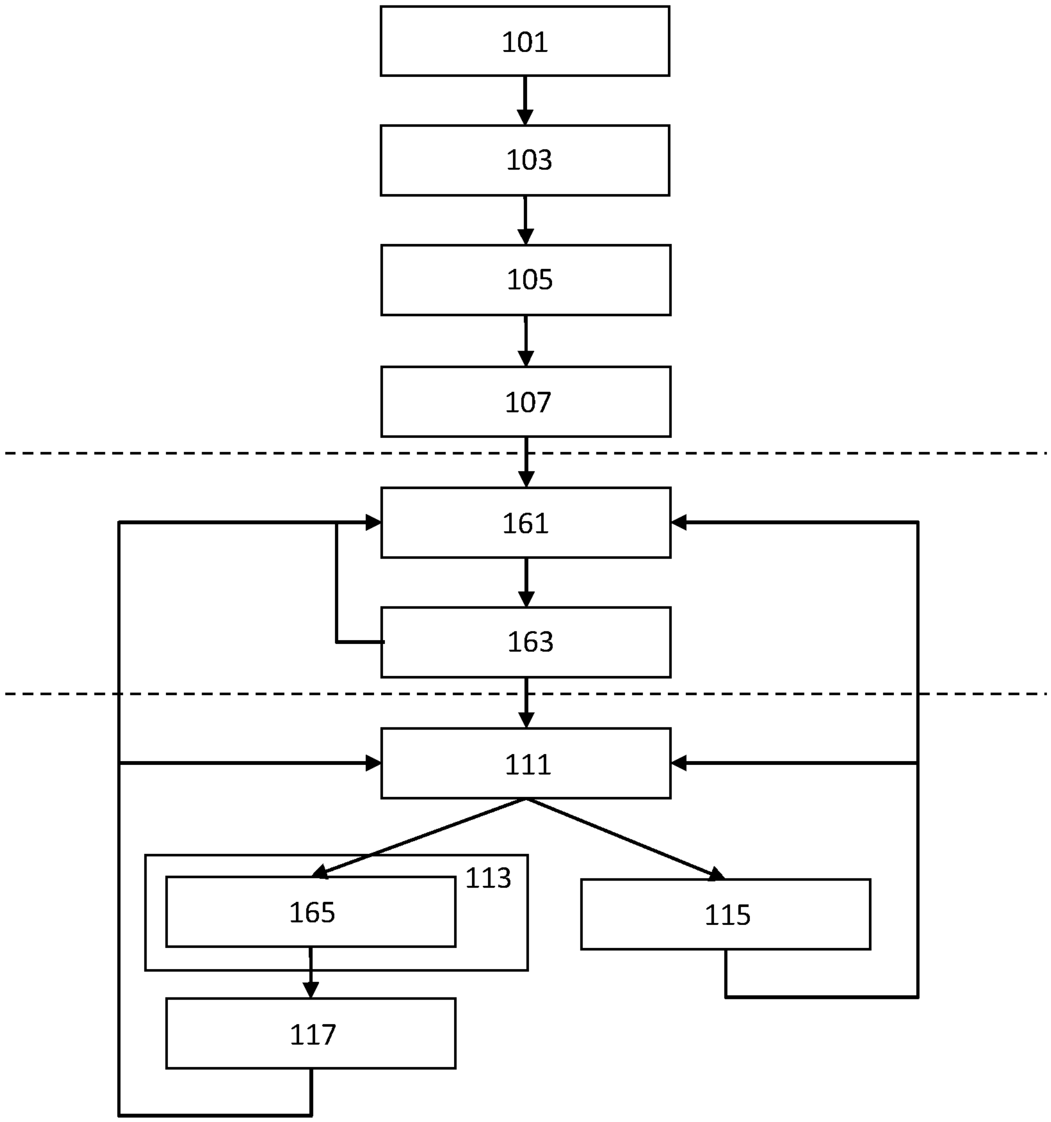
FIG. 7 is a flow diagram of a third embodiment of the method.

A third embodiment of the method of controlling a lighting system is shown in FIG. 7. Step 101 comprises displaying a first representation of the array of individually addressable light segments and a second representation of the further lighting device on a display. Step 103 comprises receiving user input, wherein the user input is indicative of an association between the second representation of the further lighting device and at least one of the individually addressable light segments of the first representation of the array. Step 105 comprises associating, based on the user input, the further lighting device with the at least one individually addressable light segment of the array. Step 107 comprises storing the association in a memory.

Later, a step 161 is performed. Step 161 comprises receiving an current command for controlling the further lighting device. The current command comprises an current light setting. Next, step 163 comprises controlling the further lighting device based on the current light setting.

Even later, step 111 is performed. Step 111 comprises receiving a command for controlling the array of individually addressable light segments. The command comprises at least one light setting for the at least one individually addressable light segment. Step 113 comprises determining a further light setting for the further lighting device. In the embodiment of FIG. 7, step 113 is implemented by a step 165. Step 165 comprises determining the further light setting for the further lighting device based on the association stored in step 107, the at least one light setting received in step 111, and the current light setting received in step 161.

Step 115 comprises controlling the array of individually addressable light segments based on the command received in step 111. Step 117 comprises controlling the further lighting device based on the further light setting determined in step 165. Step 111 is repeated after steps 115 and 117 have been performed, after which the method proceeds as shown in FIG. 7.

The embodiments of FIGS. 5 to 7 differ from each other in multiple aspects, i.e. multiple steps have been added or replaced. In variations on these embodiments, only a subset of these steps is added or replaced and/or one or more steps is omitted. For example, steps 133 and 143 and/or steps 137 and 147 may be omitted from the embodiment of FIG. 6 and/or steps 161, 163 and 165 of FIG. 7 may be added to the embodiment of FIG. 6.

Figure 8:
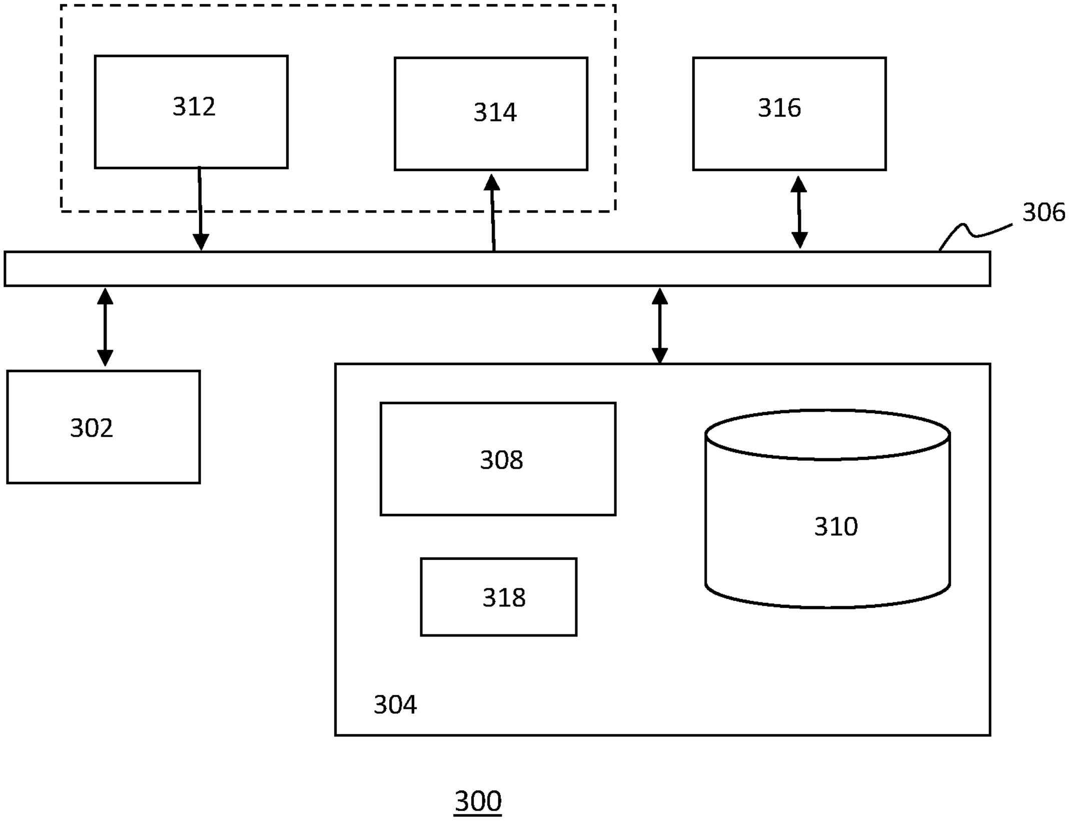
FIG. 8 is a block diagram of an exemplary data processing system for performing the method of the invention.

FIG. 8 depicts a block diagram illustrating an exemplary data processing system that may perform the method as described with reference to FIGS. 5 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 8 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting system, said lighting system comprising an array of individually addressable light segments and a further lighting device, said system comprising:

at least one input interface;

at least one output interface; and at least one processor configured to:

display, via said at least one output interface, a first representation of said array of the individually addressable light segments and a second representation of said further lighting device on a display, receive user input via said at least one input interface, wherein said user input is indicative of an association between said second representation of said further lighting device and at least one of said individually addressable light segments of said first representation of said array, associate, based on said user input, said further lighting device with said at least one of the individually addressable light segments of said array, store said association in a memory, receive, via said at least one input interface, a command for controlling said array of the individually addressable light segments, said command comprising at least one light setting for said at least one of the individually addressable light segments, and responsive to the receiving of the command for controlling said array of the individually addressable light segments:

determine a further light setting for said further lighting device based on said association and said at least one light setting, control, via said at least one output interface, said array of the individually addressable light segments based on said command, and control, via said at least one output interface, said further lighting device based on said further light setting.

2. A system as claimed in claim 1, wherein said at least one of the individually addressable light segments comprises one individually addressable light segment and said at least one light setting comprises a light setting for said one individually addressable light segment.

3. A system as claimed in claim 2, wherein said further light setting is identical to said light setting.

4. A system as claimed in claim 2, wherein said at least one processor is configured to determine said further light setting based on an extrapolation of a plurality of light settings of a plurality of addressable light segments of said individually addressable light segments.

5. A system as claimed in claim 1, wherein said at least one of the individually addressable light segments comprises a plurality of individually addressable light segments and said at least one light setting comprises a plurality of light settings for said plurality of individually addressable light segments.

6. A system as claimed in claim 5, wherein said at least one processor is configured to determine said further light setting based on an interpolation of said plurality of light settings.

7. A system as claimed in claim 1, wherein said at least one processor is configured to allow a user to link said further lighting device with said at least one of the individually addressable light segments in said first representation of said array, and wherein said association is based on said linking.

8. A system as claimed in claim 7, wherein said at least one processor is configured to allow said user to link said further lighting device with one or more light elements of said at least one of the individually addressable light segments in said first representation of said array.

9. A system as claimed in claim 7, wherein said at least one processor is configured to allow said user to link said further lighting device with said at least one of the individually addressable light segments in said first representation of said array by allowing said user to position a virtual light segment on said first representation of said array.

10. A system as claimed in claim 9, wherein allowing said user to position said virtual light segment on said first representation of said array includes allowing the user to drag said virtual light segment between pixels of said first representation of said array.

11. A system as claimed in claim 9, wherein allowing said user to position said virtual light segment on said first representation of said array includes allowing the user to drag said virtual light segment to an end of said first representation of said array.

12. A system as claimed in claim 1, wherein said at least one processor is configured to:

receive, via said at least one input interface, a current command for controlling said further lighting device, said current command comprising a current light setting, and determine said further light setting for said further lighting device based on said association, said at least one light setting, and said current light setting.

13. A system as claimed in claim 1, wherein said further light setting is at least one of light intensity and light color.

14. A system as claimed in claim 1, wherein said control of said further lighting device based on said further light setting extends a lighting effect to an outer end of said array of individually addressable light segments by linking said further lighting device to a pixel at said outer end of said array of individually addressable light segments.

15. A system as claimed in claim 1, wherein said determination of said further light setting for said further lighting device based on said association and said at least one light setting includes extrapolating a color for said further lighting device based on a color of two or more individually addressable light segments of the array.

16. A system as claimed in claim 1, wherein said command for controlling said array of the individually addressable light segments includes a command for selecting a light scene.

17. A method of controlling a lighting system, said lighting system comprising an array of individually addressable light segments and a further lighting device, said method comprising:

displaying a first representation of said array of the individually addressable light segments and a second representation of said further lighting device on a display;

receiving user input, wherein said user input is indicative of an association between said second representation of said further lighting device and at least one of said individually addressable light segments of said first representation of said array;

associating, based on said user input, said further lighting device with said at least one of the individually addressable light segments of said array;

storing said association in a memory;

receiving a command for controlling said array of the individually addressable light segments, said command comprising at least one light setting for said at least one of the individually addressable light segments; and responsive to the receiving of the command for controlling said array of the individually addressable light segments:

determining a further light setting for said further lighting device based on said association and said at least one light setting;

controlling said array of the individually addressable light segments based on said command; and controlling said further lighting device based on said further light setting.

18. A non-transitory computer readable medium for a computing device, comprising instructions to perform the method of claim 17 when the instructions are executed by a processing unit of the computing device.

* * * * *